United States Patent [19]

McKee, Jr. et al.

[11] 3,958,043

[45] May 18, 1976

[54] METHOD OF MAKING CHEMICALLY EMBOSSED SURFACE COVERINGS

[75] Inventors: Allan W. McKee, Jr., Millersville; Jack H. Witman, Lancaster, both of Pa.

[73] Assignee: Armstrong Cork Company, Lancaster, Pa.

[22] Filed: Nov. 19, 1974

[21] Appl. No.: 525,168

[52] U.S. Cl. .............................. 427/195; 427/197; 427/198; 427/201; 427/259; 427/261; 427/333; 427/340; 427/342; 428/161; 428/172

[51] Int. Cl.[2] ...................... B05D 3/04; B05D 3/10; B32B 3/00

[58] Field of Search ............ 428/172, 161; 427/195, 427/197, 198, 201, 259, 261, 333, 340, 341, 342

[56] References Cited

UNITED STATES PATENTS

| | | | |
|---|---|---|---|
| 3,000,754 | 9/1961 | Zentmyer | 427/195 X |
| 3,129,110 | 4/1964 | Anderson | 427/261 |
| 3,359,352 | 12/1967 | Powell et al. | 156/77 X |
| 3,428,471 | 2/1969 | Tuthill et al. | 428/310 X |
| 3,440,076 | 4/1969 | Vaurio | 427/195 |
| 3,554,827 | 1/1971 | Yamagishi | 427/44 X |
| 3,591,401 | 7/1971 | Snyder et al. | 427/198 X |
| 3,772,138 | 11/1973 | Witman | 427/261 X |
| 3,778,291 | 12/1973 | Elliott et al. | 427/195 |
| 3,804,657 | 4/1974 | Eyman et al. | 427/195 |

*Primary Examiner*—Harry J. Gwinnell
*Assistant Examiner*—Shrive P. Beck

[57] ABSTRACT

A process of making a decorative surface covering by preparing a granular resinous dryblend containing a polymerizable monomer compatible with the resin and having at least two olefinically unsaturated sites, depositing a layer of the monomer-containing dryblend on a backing, heating the granules to form a porous, cohesive layer therefrom, cooling the layer, and printing a decorative design on the porous layer with a first printing composition containing a polymerization inhibitor which will penetrate into the porous composition. A second printing composition containing a polymerization catalyst for the monomer is then applied over the entire surface of the printed layer, and heat and/or heat and pressure is applied to fuse the resinous granules and polymerize the monomer throughout those areas not printed with the inhibitor composition. A non-porous layer containing a printed design having an embossed resinous surface is formed wherein those areas of the surface that have not had applied thereto the polymerization inhibitor composition are coarsely textured and elevated above those areas that have been printed with the polymerization inhibitor composition and which appear as smooth, glossy, valley areas in perfect registration with the decorative design.

16 Claims, 2 Drawing Figures

METHOD OF MAKING CHEMICALLY EMBOSSED SURFACE COVERINGS

BACKGROUND OF THE INVENTION

1. Field of the Invention

This invention relates to decorative surface coverings, and more particularly to decorative floor and wall coverings. Still more particularly the invention relates to thermoplastic decorative floor and wall coverings having an embossed appearance achieved without the use of mechanical embossing.

2. Description of the Prior Art

There are a number of known processes for making embossed plastic sheets for floor and wall coverings and the like utilizing various chemical embossing techniques. For instance, U.S. Pat. No. 3,359,352—Powell et al. relates to a method for forming a resinous composition surface covering having a geometric decoration. This is accomplished by depositing a layer of fine granules of resinous composition on the surface of a base, heating to sinter the granules and form a porous layer, printing a design on the sintered layer with a printing composition which will penetrate into the porous composition and then, by heat with or without pressure, forming the printed porous layer into a non-porous layer containing an inlaid design. It is further disclosed that a textured or embossed product can be obtained by including with the granules a substance which on further treatment will create voids in the granular layer. Controlling the amount of printing composition to fill such voids controls the location and depth of the embossing.

U.S. Pat. No. 3,554,827—Yanagishi relates to the production of a decorative panel by defining a first desired design on a first surface of a sheet and then applying a polymerization retarding agent to the first surface to form a second desired design thereon. The first surfce is thereafter coated with a polymerizable resin that contracts when it is cured. The resin-coated sheet is then subjected to a polymerizing environment, such as a heated oven.

Those portions of the resin out of contact with the retarding agent cure first, and as these portions contract, the portions of the resin above the second design are stretched and thinned out. The thinned-out portions of the resin define the indented second design in the cured resin.

U.S. Pat. No. 3,428,471—Tuthill et al. relates to a method for manufacturing an embossed cellular resinous sheet by applying to the surface of a gelled foamable resinous layer having a blowing agent uniformly distributed therethrough, a barrier ink, and preferably other inks, to form a decorative pattern thereon. The entire printed surface of the resinous layer including the barrier ink is then overcoated with a second layer containing an activator for the blowing agent. After aging the product for a suitable period, a wear layer is applied and the product is heated under controlled conditions of time and temperature to fuse the resinous layers and decompose the blowing agent throughout those areas not covered by the barrier ink, thereby producing an embossed resinous surface wherein those areas of the surfce that have not had applied thereto the barrier ink are elevated with respect to other areas of the resinous surface that have been coated with the barrier ink.

U.S. Pat. No. 3,772,138—Witman contemplates imparting an embossed appearance to a thermoplastic sheet by blending a vinyl resin, a plasticizer for the resin, and a blowing agent which decomposes when heated at a temperature in the range above the glass transition temperature of the plasticized vinyl resin and below the decomposition temperature of the plasticized resin. The blend, normally in the form of a plastisol when made, is formed into a sheet. There is then applied to the sheet in predetermined pattern a barrier film, the barrier film being one which will prevent penetration into said sheet of an activator (to be subsequently applied) for reducing the decomposition temperature of the blowing agent in the sheet. There is subsequently applied over the entire surface of the sheet a liquid containing said activator in order that the activator will penetrate into the sheet and lower the decomposition temperature or accelerate the rate of decomposition of the blowing agent, or both, in those areas to which the barrier compound has not been applied. The system is then heated to decompose the blowing agent in those areas in which the blowing agent is in contact with the accelerator.

None of the foregoing processes, however, provides an embossed textured product having sharply defined lines of demarcation in the embossed areas. The process of the present invention, however, does supply a method for achieving excellent depth of relief in the embossed pattern of the product and as such constitutes an improvement over heretofore known chemical embossing techniques.

SUMMARY OF THE INVENTION

In accordance with the present invention, a textured, embossed resinous thermoplastic sheet is produced by depositing on the surface of a backing a layer of granular resinous dryblend comprising a vinyl resin, a plasticizer for the vinyl resin, and a polymerizable monomer compatible with the plasticized vinyl resin. The monomer must contain at least two olefinically unsaturated sites and be capable of addition polymerization in the presence of an addition polymerization catalyst and sufficient heat.

The dryblend is then heated to form an unfused porous cohesive printable layer which is subsequently cooled. A first printing composition containing a polymerization inhibitor that will prevent polymerization of the monomer upon the subsequent application of a polymerization catalyst and sufficient heat is applied to predetermined areas of the porous layer, and penetrates thereinto. A second printing composition containing a polymerization catalyst for the monomer is then applied to the printed porous layer. The second printing composition must overlap those areas of the porous layer containing the first printing composition. Subsequently applied heat and/or heat and pressure causes polymerization and cross-linking of the monomer in those areas printed with the catalyst containing printing composition not in contact with or overprinting the inhibitor containing printing composition, and fusion of the resinous granular material to ultimately form a decorative surface covering.

DESCRIPTION OF THE PREFERRED EMBODIMENT

Figure 1:
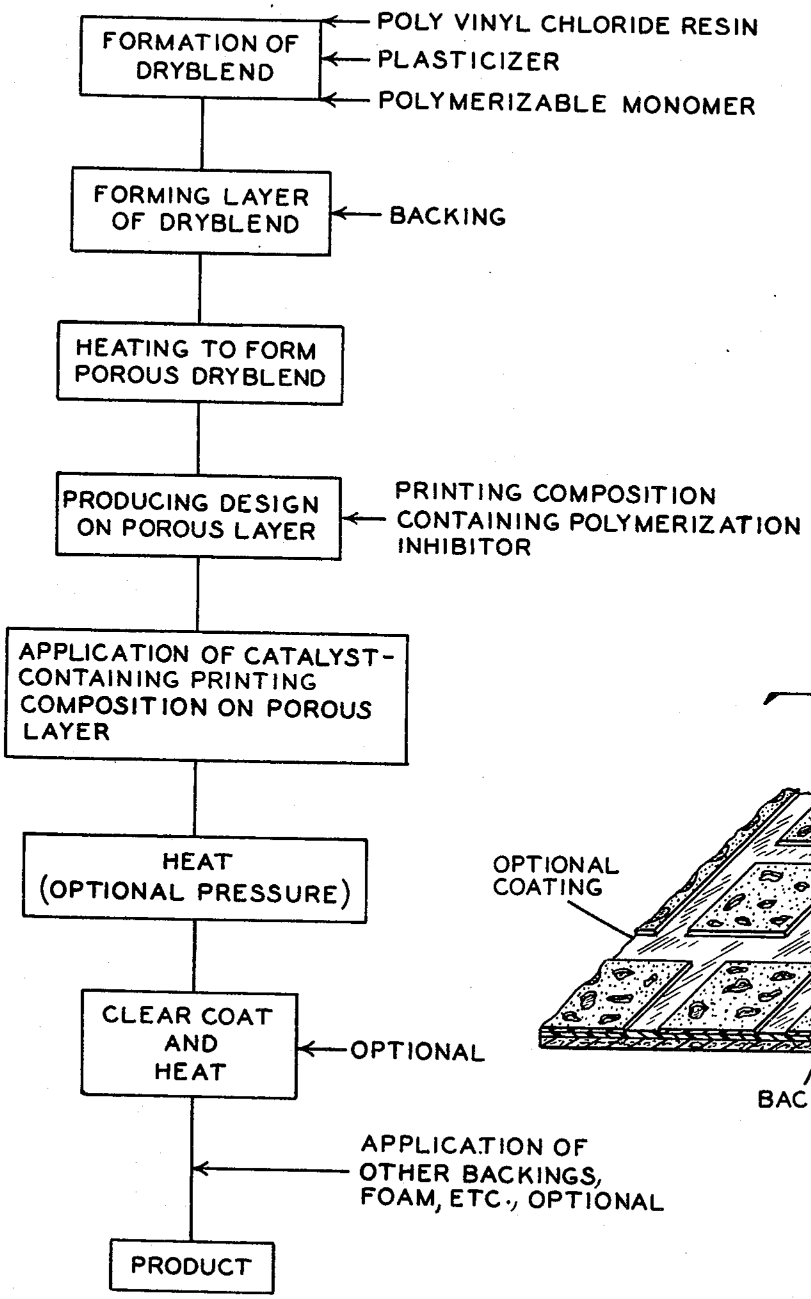
FIG. 1 is a flow diagram illustrating the method of the present invention.
Figure 2:
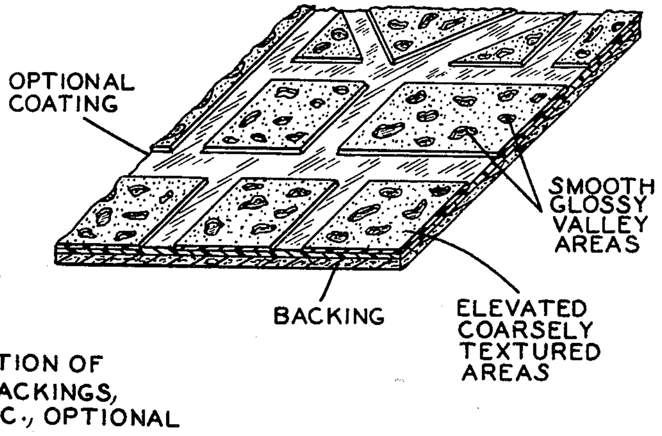
FIG. 2 illustrates an enlarged section of the product of the present invention having a backing and a top clear coat.

The thermoplastic resins useful in the present invention are those resins capable of forming films and sheets. Such resins will primarily comprise the polymers and copolymers of vinyl chloride. Poly-(vinyl chloride) itself is the preferred resin, although copolymers of vinyl chloride with vinyl acetate, vinylidene chloride, other vinyl esters such as vinyl proprionate, vinyl butyrate, as well as alkyl substituted vinyl esters may be used. Vinyl chloride may also be copolymerized with any of a number of acrylic compounds such as acrylic acid and the esters thereof and the corresponding methacrylates. When unusually excellent properties of abrasion resistance, toughness, and tensile strength are not required, as may well be the case with a wall covering or other merely decorative application, other materials may be used as a thermoplastic resin. Examples of such materials will be polystyrene, substituted polystyrene, polyethylene, polypropylene, acrylic acid, alkyl acrylic esters, alkyl methacrylic esters, and the like.

A vinyl dryblend comprising a free-flowing homogeneous mixture of unfused thermoplastic vinyl resin particles, liquid vinyl plasticizers diffused in the resin particles, fillers, pigments, and vinyl stabilizer, is readily formed by adding the resin, in the form of discrete particles, along with the vinyl resin plasticizer, such as di(2-ethyl hexyl) phthalate, butyl benzyl phthalate, epoxidized soybean oil, tricresyl phosphate, or other commonly used plasticizers, filler, pigment, and suitable vinyl resin stabilizer to a mixer or blender such as a Henschel blender, where they are mixed under moderate heat, for instance at a temperature of about 180° to 220°F., for a period of time to ensure that the liquid plasticizer and stabilizer become absorbed and thus diffused throughout the resin particles. The remaining ingredients are adsorbed thereon. Care is taken so that no fusion of the resin particles occurs during the mixing and the temperature must be kept below the point at which such fusion would occur.

Generally speaking, the addition of fillers and pigments to the mix may be made either initially, or at the end of the mixing cycle when the resin particles remain relatively warm, or aftr the dryblend resin particles have been mixed and cooled. Fillers usable in this invention may include for example limestone, silica, diatomaceous earth, and clays. The pigments may be dry pigments, or pigment pastes in plasticizer. The color of the dryblend layer may be controlled over a wide range and a substantially transparent or translucent layer may be achieved by omitting the filler and most or all of the pigment from the vinyl dryblend. A typical formulation, based on 100 parts by weight of resin, will contain 15 to 90 parts by weight plasticizer, 1 to 5 parts by weight stabilizer, 0 to 15 parts by weight pigment, and 0 to 25 parts by weight filler. The resulting composition will be a free-flowing mixture.

Critical to the present invention is the incorporation of a polymerizable monomer in the vinyl dryblend. It will simply be added to the dryblend in the blender during warming in the usual way. The monomer may also be combined with the plasticizer prior to addition of the resin particles. This monomer must have at least two olefinically unsaturated sites in its molecule. Not only does the monomer polymerize in the conditions described below, but it will also apparently cause some cross-linking of the poly(vinyl chloride) chains when poly(vinyl chloride) is the resin used. Since it is postulated that cross-linking occurs during the present process, it is necessary that the polymerizable monomer have more than one polymerizing site. At the same time, the monomer must be compatible with the vinyl resin, that is, it must be miscible therewith and be capable of being intimately disbursed therein. Examples of usable polymerizable monomers are the di and tri acrylates and the dimethyacrylates prepared by the esterification of glycols with acrylic acid and methacrylic acid. Monoacrylates and methacrylates are usable where the esterifying portion of the alcohol itself contains an olefinically unsaturated bond, as is the case in allyl acrylates. Trimethylol propane-trimethacrylate is the preferred monomer. Dicarboxylic acids may be esterified with unsaturated alcohol to produce such usable monomers as diallyl fumarate. Diolefinically unsaturated hydrocarbons such as divinyl benzenes, divinyl toluene, and the like also function to polymerize and to cross link in the present proccess. As used herein, the term monomer means a compound of relatively low molecular weight compared with the polymers it forms. As emphasized above, the only requirement for this polymerizable monomer is that it be compatible with the vinyl resin and that it have at least two olefinically unsaturated sites in the molecule which will allow the compound to polymerize under the conditions of temperature and catalyst described below. The polymerizable monomer, depending on its composition, will generally be present in the range of about 3 to 30% by weight based on the weight of the vinyl resin.

After thorough mixing has been achieved, the plasticized poly (vinyl chloride) dryblend composition containing the polymerizable monomer is doctored, roll coated, or otherwise applied to a backing such as a beater saturated rubber-asbestos sheet, for example. Other fibrous carriers may include resin-bonded glass webs, bonded synthetic webs, etc. These backings may become the final backing or may be supplemented with other cushioning materials, such as foams, non-woven material, etc. The backing may be coated with a plastisol base coat which may be pigmented or incorporate fillers such as coarse limestone, silica, metallic particles, and clays, to produce desirable visual or physical characteristics of the final product therein, or the backing may itself be decorated, as by rotogravure printing, and such decorative printing may be visible in the final product through unpigmented portions of the top layers.

The next step in the process involves heating the dryblend to cause partial melting of the resin granules at their points of contact, thereby forming bonds which result in the formation of the porous cohesive layer which is also bonded to the backing. This may be done by heating in an oven, by using radiant heat, or by hot air impingement. The heating is not sufficient to cause fusion to the resin system or thermal polymerization of the monomer. The times and temperatures involved are dependent on the formulations used.

After cooling, a design is printed on the porous layer by the application of a resinous composition to predetermined portions thereof. Suitable compositions comprise a thermoplastic resinous binder disbursed in a liquid medium.

The preferred resinous binder is one that will fuse into a continuous film upon the application of heat. The vinyl resins are preferred since they may be used as liquid compositions, such as plastisols and organosols. However, thermoplastic resins may be used such as polymers and copolymers of acrylic acid and methacrylic acid and their derivatives, polystyrene, polymerized methyl styrene, polybutadiene and the like. A plastisol utilizes a thermoplastic resin in the form of fine particles uniformly disbursed in plasticizer. Plastisol compositions for use in the invention contain about 20 to 200 parts plasticizer per 100 parts resin. An organosol is a dispersion of the resin in plasticizer and also contains a solvent carrier, with the solvent forming about 5 to 20% of the composition. The amount of solvent controls the viscosity of the organosols. Both organosols and plastisols have appreciable fluidity at normal room temperatures, which render them printable, but are converted by heat into a flexible, tough thermoplastic mass. This is brought about by the process of fusion wherein the resin becomes plasticized and solvated by the plasticizer.

Essential to the present invention is the presence of a polymerization inhibitor in the printing composition which will prevent polymerization of the monomer in those areas of the porous layer to which it is applied upon the subsequent application of heat. Certain polymerization inhibitors such as the esters and ethers of benzoquinone may be used provided they are compatible with the resinous composition, however, the preferred polymerization inhibitor is hydroquinone, generally present in the printing composition in the amount of 2 to 15 parts by weight based on the total weight of the composition.

The printing composition may be colored as desired by means of dyes or pigments, or it may be colorless. Minor amounts of stabilizers, fillers, and wetting agents may also be incorporated therein. Optionally, the resinous printing composition, and the included polymerization inhibitor, can be in the form of a solid powder. When using a solid powder composition, however, it is necessary that the particle size be substantially smaller than the dryblend granules to ermit penetration into the porous layer.

Moreover, the polymerization inhibitor need not be present in a resinous composition when applied to the porous layer. It may be applied directly to the surface of the layer, either as a liquid of a solid powder in pure form and at a full strength.

The design is preferably printed on the porous layer in sufficient amount to cause penetration thereof through the entire thickness of the layer to the backing. Printing may be done, for example, by a flat, or rotary screen printer. This ensures deep penetration of the inks in comparison to the lesser penetration that would be obtained by utilizing other conventional printing apparatus such as by rotogravure printing, for example.

The process so far has produced a vinyl dryblend layer which will normally have at this stage of the process a thickness of 15 to 100 mils, exclusive of any backing. The sheet will contain thoroughly distributed therein a polymerizable monomer in condition to be polymerized on the subsequent application of a catalyst and sufficient heat. The crux of the present invention lies in applying to portions of the above described sheet a catalyst which will initiate polymerization of the monomer upon the subsequent application of heat. However, polymerization of the monomer will occur only in those areas of the sheet to which the catalyst has been applied and which have not had applied thereto the first printing composition containing the polymerization inhibitor. Stated another way, on the subsequent application of heat, the free radicals from the catalyst will react preferentially with the inhibitor until all of the inhibitor is consumed. Polymerization of the monomer will be prevented, or delayed to the extent of inhibitor present. In these areas, the dryblend particles will soften and flow together to form a smooth, glossy design. In those areas of the dryblend where no inhibitor is present, the remaining radicals of the catalyst are free to react with the monomer which results in polymerization of the monomer. As a result of this reaction, the flow of the thermoplastic granules in these regions is restricted, which results in textured or rough areas elevated above and sharply demarcated from the smooth, glossy design areas.

These catalysts are the known free radical catalysts widely used to enhance polymerization of olefinically unsaturated compounds. They comprise primarily the organic per-compounds. Benzoyl peroxide is the preferred peroxide catalyst, however, other peroxides that may be used are di-t-butyl peroxide, lauroyl peroxide, capryloyl peroxide, acetyl peroxide, p-chlorobenzoyl peroxide, cumene hydroperoxide, and the other known peroxide initiators. Large numbers of such peroxides exist, and generally they are broken down into broader groups comprising low-temperature types, intermediate-temperature types, and high-temperature types. The high-temperature types are those generally used above 212°F. Other pre-compounds such as t-butyl perbenzoate, and isopropylpercarbonate are usable in the present process. Besides the per-compound type of free-radical initiators, there may be used such aliphatic azocatalysts as alpha, alpha'-azodiisobutyronitrile.

In order that the initiator or free radical catalyst may achieve penetration into the sheet, it also should be mixed with a liquid resinous composition as described above. Alternatively, the printing composition and the included catalyst may be in the form of a solid powder. However, as with the first printing composition, it is also necessary that the particle size of the second printing composition containing the catalyst be substantially smaller than the dryblend granules to permit penetration into the porous layer. Moreover, the catalyst need not be present in a resinous printing composition to be applied to the porous layer, and may be printed, either as a liquid or as a powder, directly on the porous layer in pure form and at full strength.

Dyes, pigments, stabilizer, fillers, and wetting agents may also be incorporated into the printing composition.

The catalyst is preferably printed on the granules in sufficient amount to cause penetration thereof through the entire thickness of the layer to the backing, except in those areas where the catalyst may overlap the first printing composition, here penetration will be substantially less than 100% due to the presence of the first resinous composition containing the inhibitor. Printing may be done by utilizing any of the conventional printing apparatus such as those described above.

By regulating the amount of penetration of the printing compositions and/or the amount of inhibitor and catalyst used, embossed products having several different heights may be achieved.

The next step in the invention is the application of heat in the range of about 300° to 400°F with or without pressure to fuse the plasticized resin, and polymerize the monomer to ultimately form a decorative surface covering.

Where the surface covering prepared by the present process is to be used as a floor covering, an additional wearing surface may be applied over the entire system prior to the final heating step.

A clear or colored coating of a thermoplastic resin may be sprayed, doctored, or roll applied over the entire sheet in a known manner. The final coating may contain a flatting agent to control the gloss. Such coating may consist of a plastisol or organosol; it normally will have little pigment or filler therein. This clear coat will be the final coat and will overlay any printing which has previously been applied to the thermoplastic sheet. On the application of heat to cause fusion of the resin and polymerization of the monomer, the clear coat will also fuse and become an integral part of the system covering both the raised and low areas on the sheet.

Cushioning layers, applied as cellular sheets or foamed latex, may be applied to the backing on the side which will be in contact with the floor.

Products which can be manufactured within the scope of this invention may include, but are not limited to, floor coverings, wall coverings, drapery and upholstery materials, furniture components, etc. Both flexible and rigid sheet products may be manufactured by the method of this invention without the use of mechanical embossing equipment and techniques and, the depressed areas thereon are in perfect registration with the printed design. The following examples are given for the purpose of illustration:

EXAMPLE 1

A plastisol back coating having the following composition is prepared:

| | Parts |
|---|---|
| Poly(vinyl chloride) | 100 |
| Dioctyl phthalate | 25 |
| 2-2,4-trimethyl-1,3-pentanediol diisobutyrate | 17 |
| Modified tin maleate (stabilizer) | 2 |

A beater-saturated sheet of rubber and asbestos of approximately 0.037 inch thickness is coated on one surface with an 8 to 10 mil thickness of the above composition.

Dryblend granules are prepared by mixing the following components together in a conventional Henschel dryblending apparatus through a heat history from ambient conditions to approximately 230°F to ambient conditions.

| | Parts |
|---|---|
| Poly(vinyl chloride) | 100 |
| Dioctyl phthalate | 20 |
| Trimethylol propane-trimethacrylate | 15 |
| Modified tin maleate (stabilizer) | 2 |

The granules are deposited on the coated base sheet to form a uniform layer of 55 mils thickness. The sheet is then heated in an air impingement oven for approximately 2 minutes. The granules, during this heating period, reach a material temperature of about 275°F to 290°F to gell the plastisol back coating and sinter the dryblend. This results in two layers on the base sheet consisting of a 40 mil sintered top portion and a 15 mil portion consisting of the gelled plastisol with sintered dryblend imbedded therein.

The sintered mass is then cooled and a design is printed on its surface. The following printing composition is used:

| | Parts |
|---|---|
| Poly(vinyl chloride) | 100 |
| Dioctyl phthalate | 32 |
| Modified tin maleate (stabilizer) | 2 |
| Pigment | 10 |
| Hydroquinone | 6 |

A second printing composition containing the following ingredients is then applied over the entire surface of the printed porous layer.

| | Parts |
|---|---|
| Poly(vinyl chloride) | 100 |
| Dioctyl phthalate | 35 |
| Epoxidized soy oil (stabilizer) | 2 |
| Alkyl aryl polyether (surfactant) | 1 |
| Calcium-zinc stabilizer | 3 |
| Pigment | 10.5 |
| Benzoyl peroxide/dibutyl phthalate | 7.5 |

The coated sheet carrying the printed sintered composition is them heated in an oven for two minutes at a temperature of approximately 238°F and then for 20 seconds at 500°F to fuse all of the resinous material and polymerize the monomer.

The final product is an embossed floor covering consisting of textured elevated areas where the dryblend granules are prevented from flowing due to the polymerization of the monomer and glossy valley areas where the granules are free to flow because polymerization is inhibited.

EXAMPLE 2

A plastisol back coating having the following composition is prepared:

| | Parts |
|---|---|
| Poly(vinyl chloride) | 100 |
| Dioctyl phthalate | 25 |
| 2-2,4-trimethyl-1,3-pentanediol diisobutyrate | 17 |
| Modified tin maleate (stabilizer) | 2 |

A beater-saturated sheet of rubber and asbestos of approximately 0.037 inch thickness is coated on one surface with an 8 to 10 mil thickness of the above composition.

A layer of dryblend granules prepared in accordance with Example 1 is deposited on the coated base sheet to form a uniform layer of 55 mils thickness. The sheet is then heated in an air impingement oven for approximately two minutes. The granules, during this heading period, reach a material temperature of about 275° to 290°F to gell the plastisol back coating and sinter the dryblend. This results in two layers on the base coat consisting of a 40 mil sintered top portion and a 15 mil portion consisting of the gelled plastisol with sintered dryblend imbedded therein.

The sintered mass is then cooled and a design is printed on its surface utilizing solid powdered granules of hydroquinone.

A 3 mil thick layer of solid powdered granules of the following composition is applied over the entire surface of the previously printed porous layer.

| | Parts |
|---|---|
| Poly(vinyl chloride) | 100 |
| Dioctyl phthalate | 40 |
| Calcium-zinc stabilizer | 2 |
| Lauroyl peroxide | 12 |

The coated sheet carrying the printed sintered composition is then heated in a hot air oven for two minutes at a temperature of 238°F and then for 20 seconds at 527°F to fuse all of the resinous material and polymerize the monomer.

The final product is an embossed floor covering consisting of textured elevated areas where the dryblend granules are prevented from flowing due to the polymerization of the monomer and glossy valley areas where the granules are free to flow because polymerization is inhibited.

What is claimed is:

1. The process of forming a textured, embossed decorative surface covering which comprises preparing a dryblend containing a. a vinyl resin, b. a plasticizer for said vinyl resin, and c. a polymerizable monomer, compatible with the plasticized vinyl resin, said monomer containing at least two olefinically usaturated sites, and capable of addition polymerization at a temperature in the range of from about 300°–400°F in the presence of an addition polymerization catalyst, depositing a layer of the dryblend on a backing, heating to form an unfused porous cohesive layer from said dryblend, applying to said porous layer in a predetermined pattern a first printing composition containing a polymerization inhibitor that will prevent polymerization of said monomer in said temperature range, applying over the entire surface of the printed porous layer a second printing composition containing a catalyst that will cause polymerization of said monomer in said temperature range, and heating the resulting layer to said temperature range to fuse the resinous dryblend, and polymerize and cross-link said monomer in those portions of said dryblend not printed with said first printing composition.

2. The process according to claim 1 including the step of depositing a plastisol coating on the surface of the backing prior to deposition of the dryblend.

3. The process according to claim 2 wherein the plastisol coating is a filled plastisol.

4. The process according to claim 2 including the step of gelling the plastisol prior to deposition of the dryblend.

5. The process according to claim 1 wherein said vinyl resin comprises poly(vinyl chloride).

6. The process according to claim 1 wherein said monomer comprises trimethylol propane-trimethacrylate.

7. The process according to claim 6 wherein said monomer comprises about 3 to 30% by weight based on the weight of the vinyl resin.

8. The process according to claim 1 wherein said first printing composition comprises a. a liquid that will penetrate said porous layer, and b. a polymerization inhibitor that will prevent polymerization of said monomer in said temperature range.

9. The process according to claim 8 wherein said liquid that will penetrate said porous layer comprises a plasticizer for said vinyl resin.

10. The process according to claim 8 wherein said polymerization inhibitor comprises hydroquinone.

11. The process according to claim 10 wherein said printing composition comprises about 2 to 15 parts by weight hydroquinone based on the total weight of the composition.

12. The process according to claim 8 wherein said printing composition comprises fine powdered granules of hydroquinone.

13. The process according to claim 1 wherein said second printing composition comprises a. a liquid that will penetrate said porous layer, and b. a catalyst that will cause polymerization of said monomer in said temperature range.

14. The process according to claim 13 wherein said liquid that penetrates said porous layer comprises a plasticizer for said vinyl resin.

15. The process according to claim 13 wherein said catalyst comprises lauroyl peroxide.

16. The process according to claim 13 wherein said catalyst comprises benzoyl peroxide.

* * * * *